Aug. 10, 1954  M. J. VOGEL  2,686,267
DEVICE FOR INSPECTING EGGS
Filed April 16, 1951
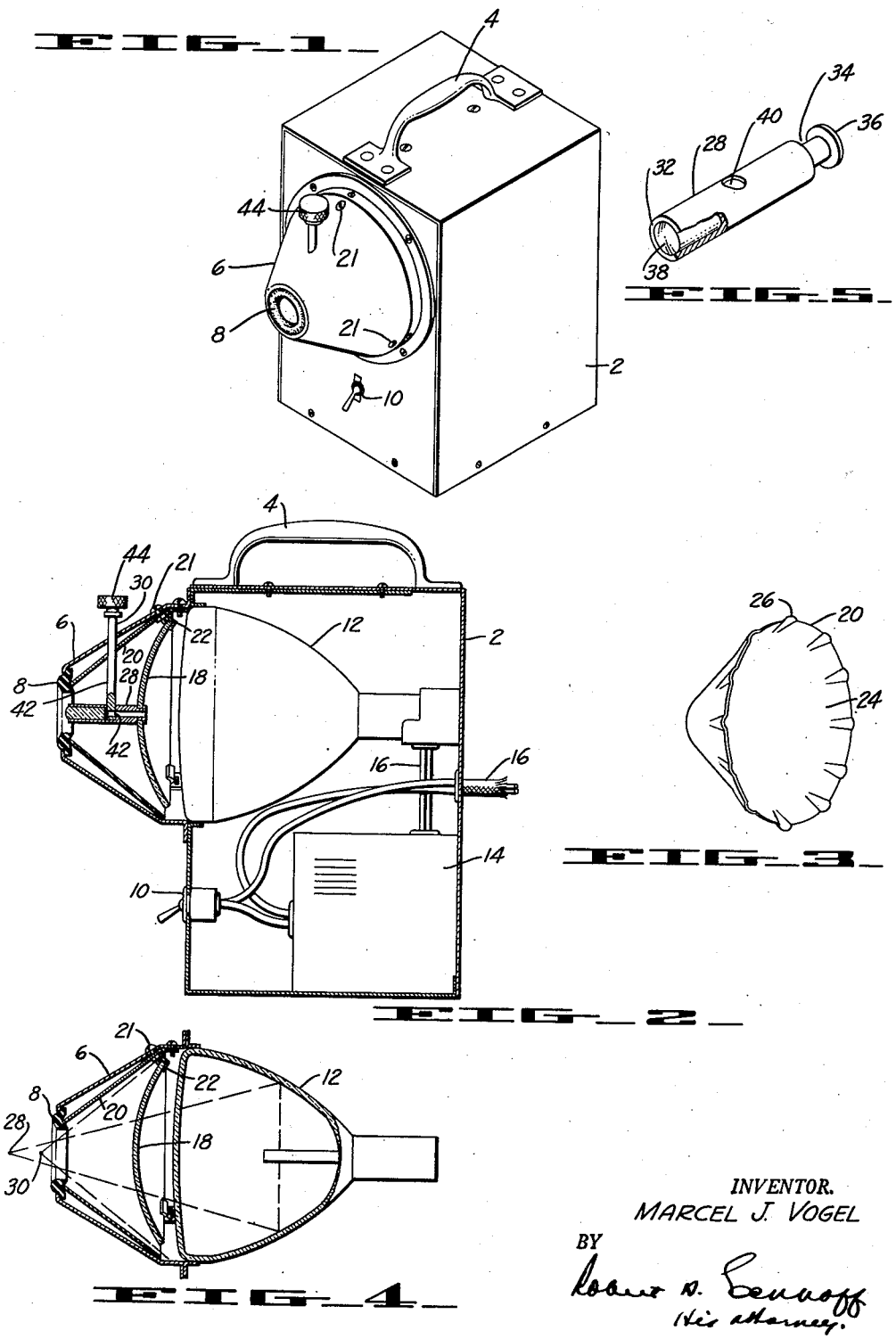
INVENTOR.
MARCEL J. VOGEL
BY Patented Aug. 10, 1954

2,686,267

UNITED STATES PATENT OFFICE 2,686,267

DEVICE FOR INSPECTING EGGS

Marcel J. Vogel, San Francisco, Calif., assignor to Vogel Luminescence Corp., a corporation of California Application April 16, 1951, Serial No. 221,304

5 Claims. (Cl. 250—71)

This invention relates to a device for candling eggs and particularly to a device wherein the eggs can be candled when exposed to ultraviolet light at the same time.

For many years it has been customary to candle eggs before they are marketed in order that spoiled eggs as well as eggs having imperfections such as blood spots, could be detected and kept off the market. In many communities all eggs must be candled in order that they may be legally sold and even where this is not a positive requirement, eggs which have been candled demand a premium price. Recently it has been found that if ultraviolet light is used for inspecting eggs, a condition may be revealed which is entirely undetectable by means of ordinary visible light. One organism which causes eggs to sour in storage is Pseudomonas fluorescens, and this bacterium may be detected under ultraviolet light by the brilliant green fluorescence which it imparts to the albumen of the egg. By this means, sour eggs as well as those which are destined shortly to become sour, may be readily detected.

Although this particular condition may be readily picked up by means of ultraviolet light, conventional ultraviolet sources do not provide sufficient illumination in the visible range for carrying on the conventional candling process. This has necessitated the use of two separate inspecting stations for the proper examination of eggs: a first conventional candling operation conducted with visible light and a second operation conducted under ultraviolet light for the detection of the pseudomonas bacterium. It has heretofore been considered impossible to combine the two operations since it was believed that if a sufficiently strong source of visible light were used in combination with the ultraviolet light to conduct the conventional candling operation, the fluorescent effect would be masked. I have now discovered that by the proper selection of light source, filter and hood, as hereinafter described in detail, one may obtain a light source having discrete zones of ultraviolet light and visible light which enables one to conduct both a conventional candling operation and an ultraviolet inspection of an egg at the same time. Such a device works well with eggs which are fairly light in color, but for extremely dark shelled eggs additional visible light is necessary and my invention includes such an auxiliary source of controlled visible light.

It is an object of the present invention to provide a device for candling eggs which provides a combined source of ultraviolet and visible light in which the two forms of light are in discrete zones.

It is a further object of the present invention to provide a device for inspecting eggs by ultraviolet light which provides an intense beam of ultraviolet light so that the operation can be conducted in a subdued light area.

It is another object of my invention to provide a device for candling eggs of generally improved design.

Still another object of my invention is to provide an egg candling device in which the visible light can be increased at will by the operator.

Other objects and features of advantage, together with the foregoing, will appear hereinafter wherein the present preferred form of the device of this invention is disclosed.

Reference is made to the drawings forming a part hereof, illustrating a preferred embodiment of the present invention. In the drawings:

Figure 1 is a perspective view of my improved egg candling device.

Figure 2 is a cross section of my egg candling device showing in detail the arrangement of the internal parts.

Figure 3 is a perspective view of one form of light reflecting hood used in my egg candling device.

Figure 4 is a sectional view of the lamp, filter and hood, showing the principal points of focus of ultraviolet and visible light in my egg candling device.

Figure 5 is a perspective view, partly in section, of the device which is used to increase the amount of visible light.

The device is housed in a box 2 which is preferably made of thin sheet metal. The box 2 is equipped with a handle 4 for convenience in carrying, a protective hood 6 and an aperture member 8. A suitable switch 10 is provided for turning the electricity on and off. Inside the housing 2 is located a suitable source of ultraviolet light 12 which is connected to a transformer 14 by means of wires which have been generally designated 16. The light source 12 is preferably a mercury vapor discharge lamp with a built-in reflector which emits both visible and ultraviolet light. I have found the lamps sold commercially by the General Electric Company and the Westinghouse Electric Company, designated "CH4 Spot, mercury vapor," are entirely suitable for my purpose. To hold back most of the visible light a filter 18 is employed in front of lamp 12. The filter is preferably one of Pyrex heat-resisting glass with suitable proportions of nickel and cobalt salts to hold back the visible radiations and which admits a maximum passage of light therethrough at a wave length of 3660 to 3680 Angstrom units. I have found that the filter sold by the Corning Glass Company, designated No. 5876, to be entirely suited for my purpose.

As can be seen from Figures 2 and 4, there is located within the protective hood 6 a second or reflecting hood 20. This reflecting hood 20 will be described in greater detail hereafter and, as can be seen from Figure 2, is held in place by the annular aperture member 8 at its small end, and by bolts 21 at its larger end. The filter 18 is held in place by clamping between the bolts 21 and angular members 22. Bolts 21 and angular members 22 are each preferably three in number, although four or more of each may be used.

The reflecting hood 20 is an essential feature of the present invention. As is shown in detail in the drawings, the reflecting hood 20 is made in the form of a truncated cone. The angle of the cone is rather critical and I have found that for best results the sides of the cone should make an angle with the base of the cone of about 48°. The inner surface of cone 20 has been designated 24 and is of highly polished metal such as alzac aluminum, stainless steel or tin-plated steel. The reflecting hood 20 has been found to increase greatly the amounts of ultraviolet light transmitted through the aperture 8. By having the sides of the hood at an angle of 48°, as heretofore described, a portion of the light which is directed from lamp 12 strikes the hood and is reflected one or more times by the hood and the reflector on lamp 12 and is, eventually, emitted through the opening 8. Thus, light which would otherwise be lost through scattering is redirected by means of the hood and becomes available for the inspecting and candling operation.

In order that visible as well as ultraviolet light be available for the inspection operation, means have been provided so that a small amount of visible light mass pass around the filter 18 and through the aperture 8. A preferred means for accomplishing this is shown in Figures 2 and 4 wherein the largest diameter of the hood 20 is larger than the filter 18. This serves to admit a small amount of visible light around the edge of filter 18. In one specific embodiment, the filter was 4 inches diameter, was spaced ¼" from the face of bulb 12 and the hood 20 was spaced ½" from the filter, measured at right angles to the inner surface of the hood. Another means of accomplishing this is to provide a series of dents 26 near the base of the conical reflecting hood 20. The manner in which these dents are formed is clearly shown by Figure 3. These dents admit light in the same manner as the spacing of Figure 2.

In Figure 4 is shown a view of the lamp and hood assembly in cross section wherein the principal points of focus of ultraviolet and of visible light have been indicated. The principal focus of ultraviolet light is at the point 28 which, as a practical matter, is from ¾ to 1 inch beyond the plane of the aperture 8, while the principal focus of visible light is at point 30 which preferably lies at about the plane of aperture 8 and not more than about ¼" beyond the plane of aperture 8. Thus, if one holds a screen about an inch beyond aperture 8, at the principal point of focus of the ultraviolet light, the rays of visible light will show on the screen as a ring slightly less in diameter than the diameter of an ordinary hen egg.

The structure heretofore described serves well to candle eggs having a light color by both fluorescent and visible light. However, if the eggs have very dark shells, sufficient visible light may not be emitted to candle the eggs satisfactorily. For use with such eggs, I provide certain additional equipment which will now be described. The auxiliary equipment consists of a tube and a rod, set at right angles to each other which have been designated generally 28 and 30, respectively, in the drawing. Tube 28 is shown in detail in Figure 5 and consist of an outer shell 32 which has a recess 34 at one end, and a collar 36 adjacent thereto. The bore of the tube at the end having the collar and recess is preferably less than the bore at light emitting end of the tube. The light emitting end of the tube is filled with a light conducting substance 38 which may be a clear plastic such as Lucite (methyl-methacrylate polymer), glass or fused quartz and preferably the light emitting end of the filling has a convex shape as shown in Figures 2 and 5. A round hole 40, of somewhat less than the diameter of tube 28, is placed about in the middle of the tube and at right angles to the major axis of the tube. This hole may go completely through tube 8, or only just beyond the axial bore, as shown. Tube 28 fits into a hole at the center of filter 18, being retained in place by collar 36 which is spun into the position shown after the tube is inserted into the filter.

Fitting into the hole 40 in tube 28 is a rod 42 which has a small hole 44 bored at right angles to its major axis and near its lower end. Hole 42 corresponds in size to the lesser diameter of the axial bore of tube 28. The upper end of rod 42 is equipped with a knurled knob 44, so that it can be readily turned. As is apparent from the drawing, when rod 42 is turned so that its hole is lined up with the bore of tube 28, light will be passed through the tube, while if at right angles, no light will be passed through the tube. The quantity of light may be regulated by turning the rod to an intermediate position.

It is apparent that other means such as an iris diaphragm or a shutter can be used to vary the amount of visible light passed through tube 28.

If it is desired to build a device for candling light colored eggs only, the tube 28 and rod 30 can be omitted from the structure, so the device will be that illustrated by Figure 4. Many areas concentrate on raising only chickens which produce light colored eggs, so that in many instances it is not necessary to use the tube 28 and rod 30.

In use, it is only necessary to plug the egg candling device into a suitable source of electricity and, after the lamp reaches the operating temperature, to hold an egg at the aperture 8. With the opening on tube 28 closed a sufficient amount of visible light is passed through the aperture 8 so that one may examine light colored eggs in the conventional manner for defects which are revealed by visible light. At the same time, sufficient ultraviolet light is available so that if the eggs are infected with pseudomonas, the fluorescent effect will be immediately apparent. If very dark eggs are being candled, the rod 30 will be turned to admit a sufficient amount of visible light for candling the eggs.

In practicing my invention, I prefer to use a combination of filter, hood and light source which will give the maximum amount of visible light without masking the fluorescent effect of the pseudomonas bacteria. This is achieved by the use of the specific reflector, light source and filter that I have described, but my invention is not limited thereto, and it will be apparent to those skilled in the art that the same ultimate effect may be secured by the selection of a variety of components.

In the embodiment of the invention shown in the drawings, it is apparent that the device is primarily adapted for visual examination of eggs which are held by hand in front of the aperture 8. However, my invention is not limited thereto, as the candling means can be used to move the eggs in front of the aperture 8 and photo-electric means may be used in combination with an automatic signal or rejection device to interpret and act upon the light pattern produced by the egg. Further, mechanical devices may be used to rotate the rod 30.

I claim:

1. A device for candling eggs of the class described, having in combination as a source of light, a mercury vapor spot light which emits light in both the ultra-violet and visible bands, a light reflecting hood placed thereover, said hood being in the form of a truncated cone wherein the sides of the cone make an angle to the base of the cone of about 48°, the interior of said hood being of a highly polished metal, said truncated portion of the cone providing an aperture for candling eggs, a filter interposed between said truncated cone and said spot light, said filter admitting a maximum passage of light therethrough at a wave length of from 3660 to 3680 Angstrom units, and a space between the edge of the filter and the hood whereby visible light can pass around the filter and into said hood, said structure providing a candling device emitting sufficient fluorescent light to produce a fluorescent effect on eggs affected with pseudomonas bacteria, and emitting sufficient visible light to permit candling eggs, but insufficient visible light output to mask the fluorescent effect.

2. The candling device of claim 1 wherein the filter has a small central aperture therein, and a light conducting tube in said aperture for conducting visible light to the aperture of the reflecting hood, and valve means in said tube to control the amount of visible light passing therethrough.

3. The method of candling eggs comprising inspecting eggs in a single field of penetrating illumination, said illumination consisting of controlled amounts of both ultra-violet and visible light, the intensity of the ultra-violet light being sufficient to cause fluorescence of the interior of eggs affected with pesudomonas bacteria and said visible light being of sufficient intensity for the conventional simultaneous candling of eggs and being of insufficient intensity to mask the fluorescent effect.

4. The method of candling eggs comprising inspecting eggs in a single field of penetrating illumination, said illumination consisting of controlled amounts of both ultra-violet and visible light, the intensity of the ultra-violet light being sufficient to cause fluorescence of the interior of the eggs containing materials which fluoresce under ultra-violet light, and said visible light being of sufficient intensity for the conventional simultaneous candling of eggs and being of insufficient intensity to mask the fluorescent effect.

5. The method of inspecting a translucent object, said translucent object being capable of transmitting a small amount of visible light and containing a substance fluorescing under ultra-violet light, comprising placing said object in a single field of penetrating illumination, said illumination consisting of controlled amounts of both ultra-violet and visible light, the intensity of the ultra-violet light being sufficient to cause detectable fluorescence of the interior of the object when the object contains a fluorescent material and said visible light being of sufficient intensity to illuminate the interior of the object and being of insufficient intensity to mask the fluorescent effect.

References Cited in the file of this patent

UNITED STATES PATENTS

| Number | Name | Date |
|--------|------|------|
| 615,899 | Preston | Dec. 13, 1898 |
| 2,227,881 | Dooley | Jan. 7, 1941 |
| 2,267,834 | Mulvany | Dec. 30, 1941 |
| 2,321,900 | Dooley | June 15, 1943 |
| 2,337,746 | Garstang | Dec. 28, 1943 |

OTHER REFERENCES

Luminescence, P. Pringsheim et al., Interscience Publishers, Inc., 1943, pp. 118–121. Copy in Patent Office Library.